(12) United States Patent
Guan et al.

(10) Patent No.: US 8,970,985 B2
(45) Date of Patent: Mar. 3, 2015

(54) GRADED BEVEL TAPERED WRITE POLE DESIGN FOR FIELD ENHANCEMENT

(71) Applicant: Headway Technologies, Inc., Milpitas, CA (US)

(72) Inventors: Lijie Guan, San Jose, CA (US); Po-Kang Wang, Los Altos, CA (US); Moris Dovek, San Jose, CA (US); Joe Smyth, Aptos, CA (US); Kenichi Takano, Cupertino, CA (US); Yoshitaka Sasaki, Santa Clara, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/139,069

(22) Filed: Dec. 23, 2013

(65) Prior Publication Data

US 2014/0111886 A1    Apr. 24, 2014

Related U.S. Application Data

(62) Division of application No. 12/150,553, filed on Apr. 29, 2008, now Pat. No. 8,625,234.

(51) Int. Cl.
*G11B 5/23* (2006.01)
*G11B 5/31* (2006.01)
*G11B 5/127* (2006.01)

(52) U.S. Cl.
CPC .......... *G11B 5/1278* (2013.01); *G11B 5/3116* (2013.01); *G11B 5/3146* (2013.01)
USPC ................ 360/119.04; 360/122; 360/125.12; 360/125.13; 360/125.15

(58) Field of Classification Search
CPC .. G11B 5/1278; G11B 5/3146; G11B 5/3116; G11B 5/23
USPC ................. 360/119.02, 119.04, 122, 125.09, 360/125.13, 125.19
See application file for complete search history.

(56) References Cited

U.S. PATENT DOCUMENTS

| | | | |
|---|---|---|---|
| 6,621,659 | B1 | 9/2003 | Shukh et al. |
| 6,680,815 | B2 | 1/2004 | Sasaki |
| 7,116,517 | B1 | 10/2006 | He et al. |
| 7,133,253 | B1 | 11/2006 | Seagle et al. |
| 7,151,647 | B2 | 12/2006 | Sasaki et al. |
| 7,193,815 | B1 | 3/2007 | Stoev et al. |
| 8,027,125 | B2 | 9/2011 | Lee et al. |
| 2003/0112555 | A1 | 6/2003 | Sato et al. |
| 2005/0219743 | A1* | 10/2005 | Guan et al. .............. 360/125 |
| 2006/0044677 | A1 | 3/2006 | Li et al. |
| 2007/0211377 | A1 | 9/2007 | Sasaki et al. |
| 2008/0316653 | A1* | 12/2008 | Sasaki et al. ........... 360/319 |
| 2009/0059426 | A1* | 3/2009 | Sasaki et al. .......... 360/125.02 |
| 2009/0116145 | A1* | 5/2009 | Guan et al. ............ 360/125.02 |

OTHER PUBLICATIONS

Japanese Office Action, Headway Technologies Inc., Patent App. 2009-111316, Mailed: Oct. 24, 2013.

* cited by examiner

*Primary Examiner* — Craig A. Renner
(74) *Attorney, Agent, or Firm* — Saile Ackerman LLC; Stephen B. Ackerman

(57) ABSTRACT

A structure and a process for a perpendicular write pole that provides increased magnetic flux at the ABS is disclosed. This is accomplished by increasing the amount of write flux that originates above the write gap, without changing the pole taper at the ABS. Three embodiment of the invention are discussed.

5 Claims, 4 Drawing Sheets

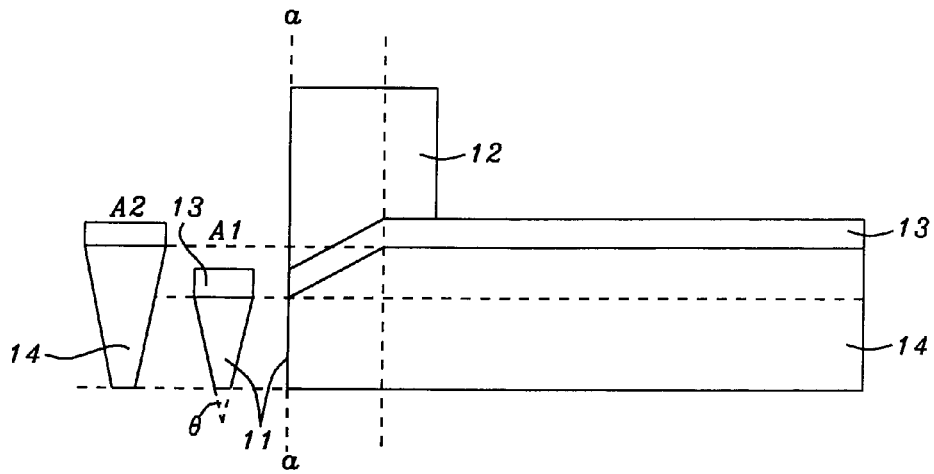
FIG. 1 – Prior Art
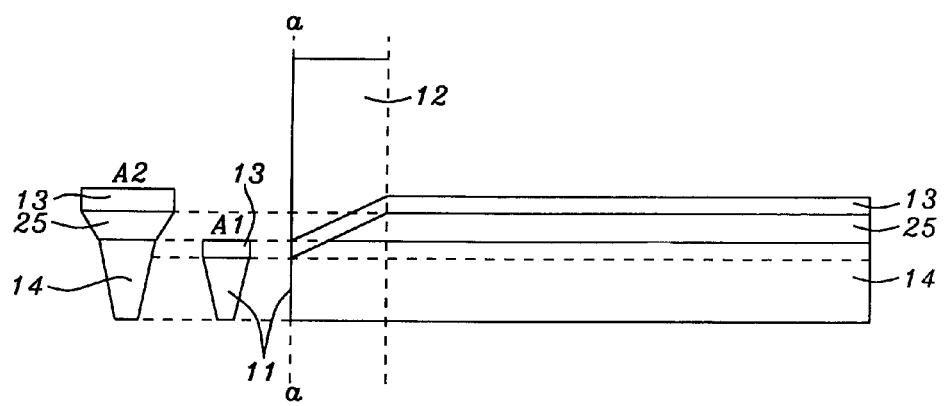
FIG. 2

GRADED BEVEL TAPERED WRITE POLE DESIGN FOR FIELD ENHANCEMENT

This is a Divisional Application of U.S. patent application Ser. No. 12/150,553, filed on Apr. 29, 2008, which is herein incorporated by reference in its entirety, and assigned to a common assignee.

FIELD OF THE INVENTION

The invention relates to the general field of perpendicular magnetic writers with particular emphasis on delivering more flux to the ABS (air bearing surface).

BACKGROUND OF THE INVENTION

Tapered write gaps have been previously used to enhance field and field gradient, as shown in FIG. 1. It is based on the fundamental principle of increasing the choke area around the neck region so that the sides of ABS 11 are not quite parallel but, instead, converge at an angle θ thereby providing gradual flux concentration to bring additional field to the ABS. Because of the slope of the main pole, the area A2 behind the ABS is larger than the area A1 at the ABS. So a larger ratio of A2 to A1 corresponds to more flux concentration at the ABS. Other elements shown in FIG. 1 include trailing shield 12, write gap 13, and main pole 14.

As track widths narrow, still further enhancements are needed to this flux concentration approach. While steeper tapered write gap angles can increase A2/A1, the main drawbacks are the processing difficulty and too high a sensitivity of the ABS area A1 to the ABS lapping position 'aa'. If the taper angle θ is too large, a small displacement of ABS line 'aa', caused by the ABS lapping process, will result in a large change in both the ABS area and the physical width of the main pole. Therefore, methods for flux concentration are required that are not overly sensitive to changes in the angle at which the write gap lies relative to the ABS.

A routine search of the prior art was performed with the following references of interest being found:

In U.S. Pat. No. 6,621,659, Shukh et al. say "it is common to taper the pole from the larger width in the paddle region to a narrower width in the pole tip region at the ABS." However, the form of the taper is different from that disclosed by the present invention. U.S. Pat. No. 7,151,647 (Sasaki et al—Headway) shows a yoke portion having a wide portion, a narrow portion, and a sloping flare portion and U.S. Patent Application 2006/0044677 (Li et al—Headway) teaches a plated bevel pole design where the top is wider than the bottom.

U.S. Pat. No. 7,193,815 (Stoev et al) shows an upper section of the write shield wider than the lower section. U.S. Pat. No. 7,116,517 (He et al) teaches a T-shaped pole tip. U.S. Pat. No. 7,133,253 (Seagle et al) discloses a tapered pole tip while U.S. Pat. No. 6,680,815 (Sasaki) shows a tapered write gap as part of their FIG. 9.

SUMMARY OF THE INVENTION

It has been an object of at least one embodiment of the present invention to provide a perpendicular write pole that provides increased magnetic flux at the ABS.

Another object of at least one embodiment of the present invention has been to provide a process for manufacturing said write pole.

Still another object of at least one embodiment of the present invention has been to achieve the above objects without increasing the degree of taper of the pole at the ABS.

A further object of at least one embodiment of the present invention has been to render performance of the completed device insensitive to small variations of the precise location of the ABS relative to other parts of the structure.

These objects have been achieved by increasing the amount of write flux that originates above the write gap without changing the pole taper at the ABS. In a first embodiment, this is achieved by increasing the taper of the section above the write gap. In a second embodiment, this section is extended so that it overlaps the write gap laterally. In a third embodiment, a part of this section is brought closer to the ABS while keeping the main parts of the write pole and the trailing shield well separated, magnetically speaking.

BRIEF DESCRIPTION OF THE DRAWINGS

FIG. 1:

Examiner has correctly observed that numeral "13", which designates the write-gap layer of this Prior Art drawing, incorrectly points to the magnetic pole rather than the write gap layer. The numeral "13" has, therefore, been moved so that it points correctly to the write-gap layer. In addition, facing edges of write-gap layer 13 are now shown on the top surface of the pole at both the A2 recessed cross-section and the A1 ABS cross-section.

FIG. 2 and FIG. 3

Figure 3:
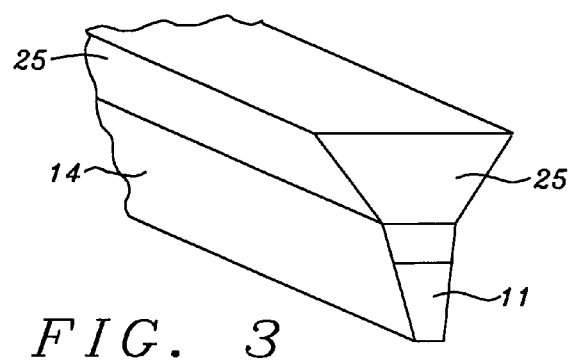

These two drawings illustrate an embodiment that was claimed in the allowed parent application and is not claimed in the present divisional application. Although the claims in the parent application were amended to correctly reflect the Specification and the figures, the figures themselves were not corrected. FIGS. 2 and 3 have been amended to correctly show the vertical positioning of write-gap layer 13, upper pole layer 25 and lower pole layer 14 at the pole cross-section A2 that is recessed from the ABS.

FIG. 4 and FIG. 5

Figure 4:
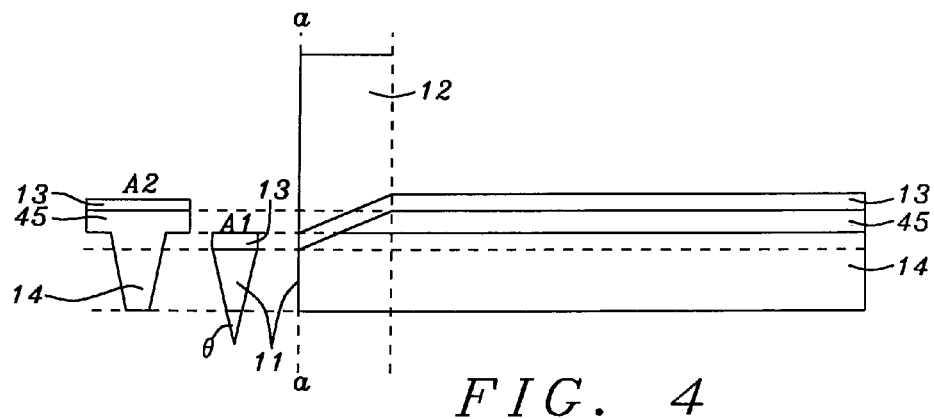
Figure 5:
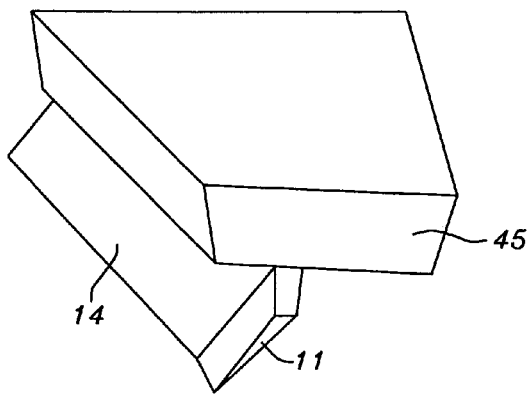

Applicant has corrected FIG. 4 and FIG. 5 to make them consistent with the descriptions in the text of the Specification and to insure that the claim and the drawings agree with each other.

FIG. 4 shows two front-facing cross-sectional views and a side facing view of a two layered magnetic pole. The front facing view, A1, closest to the side facing view is a view of the ABS plane. The leftmost front-facing view, A2, is a recessed cross-sectional view of the pole recessed from the ABS at the dashed vertical line. The figure corrections of A2 now show that write-gap layer 13 is on top of upper pole layer 45, which, in turn, is on top of lower pole layer 14. Element 11 is the ABS face of the pole, which forms the front face of lower pole layer 14 shown as A1.

FIG. 5:

FIG. 5 is a 3-dimensional (isometric) illustration of the pole of FIG. 4 as it would appear if the write-gap layer (layer 13) were not present. The triangular surface labeled 11 is the ABS surface of the pole and it appears tilted because the bevel is drawn as though it were in the plane of the figure. The small trapezoidal region that, in original FIG. 5, was incorrectly labeled 13 ("13" should designate the write-gap layer, which does not appear in this figure) is simply the beveled portion of lower pole layer 14.

Figure 6:
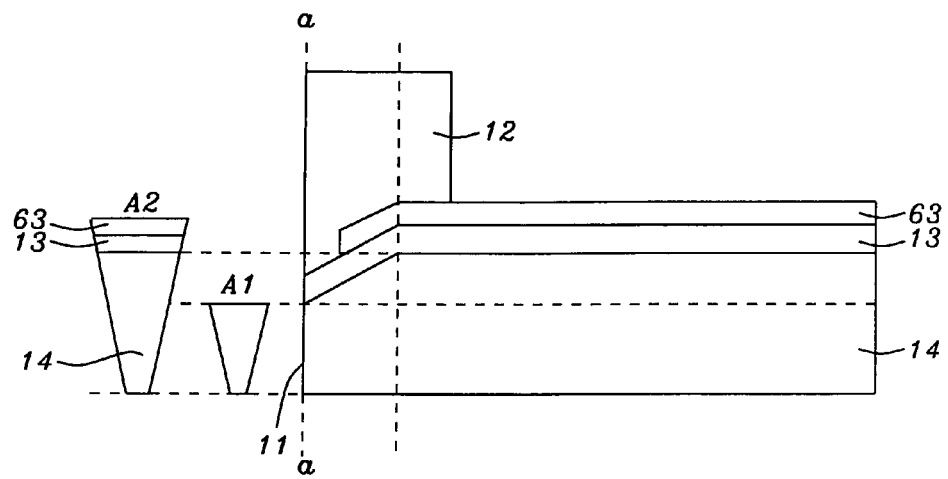

FIG. 6:

FIG. 6 has been corrected to show the proper position of the two-layer write-gap layer, 13 and 63, at the recessed planar cross-section shown by the vertical dashed line.

Figure 7:
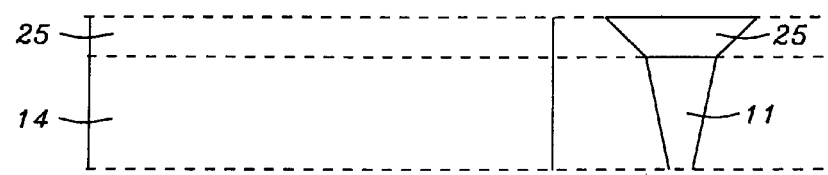
Figure 8:
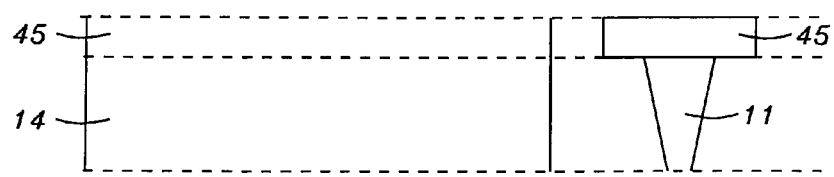

FIGS. 7-8 show process steps to make the 1$^{st}$ and 2nd embodiments respectively.

Figure 9:
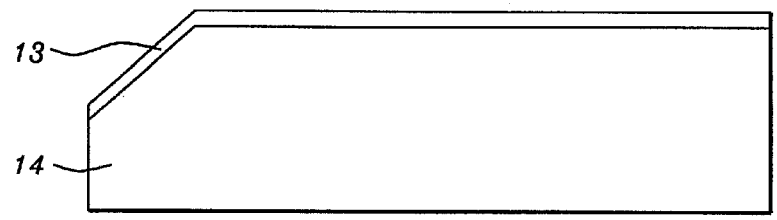

FIG. 9 shows the starting point for manufacturing the 3$^{rd}$ embodiment.

Figure 10:
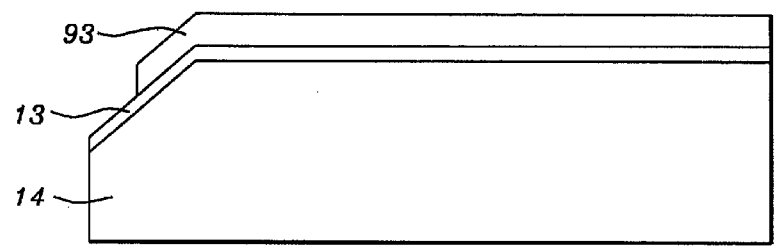
Figure 11:
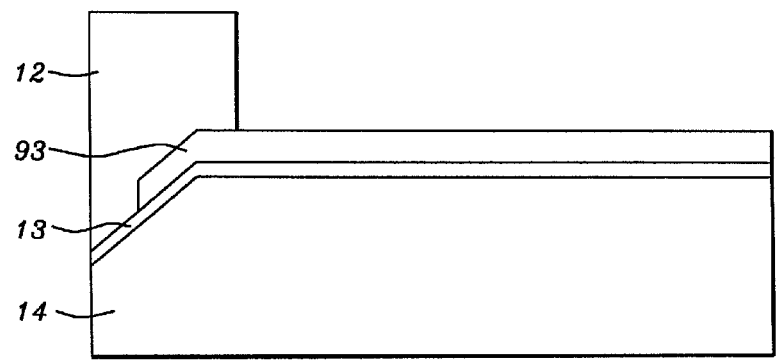

FIGS. 10 and 11 show additional steps in the manufacture of the 3$^{rd}$ embodiment.

DESCRIPTION OF THE PREFERRED EMBODIMENTS

We describe below three embodiments of the invention, presented as processes for manufacturing the invention while also serving to describe the invented structure:

It should be noted that the descriptions that follow below, along with their drawings, are written as though the bodies described there, including in some cases cantilever-like projections, have no external support. In reality, these bodies are embedded in one or more layers of insulating material (typically $Al_2O_3$) which provide whatever mechanical support that is needed without influencing the performance of the device being portrayed. In the interests of simplifying both the descriptions and the figures, these supporting layers are not necessarily shown or mentioned.

FIG. 2 shows the first of the new configurations disclosed in the present invention to enhance flux concentration ratio A2/A1 while still keeping the taper angle of the write gap unchanged. Compared to the prior art shown in FIG. 1, main pole 14 taper is now formed from two layers, 14 and 25.

To form layer 14, a first trench, with sidewalls that slope at an angle θ to the vertical, is formed in a layer of insulation (not shown) to a first depth. This trench is now just filled (overfill followed by CMP) with a layer of material suitable for the main pole followed by a non-magnetic layer (for the write gap). The (filled) first trench is then covered with a second layer of insulation (also not shown). A second trench, whose floor is aligned with the roof of the first trench, is now formed in the second insulation layer, said second trench having sidewalls that slope at an angle greater than θ. The second trench is then just filled with the same material as the first trench, thereby forming layer 25 and completing formation of element 14 as seen in FIG. 7.

This is followed by an angle-lapping step to form the appropriately sloped surface onto which non-magnetic write gap layer 13 is then deposited (as well as being simultaneously deposited onto the top surface of lower pole 14). The process concludes with the deposition and shaping of trailing shield 12.

Thus top part 25 of layer 14 has a larger taper angle than bottom part 11, which increases A2 relative to A1 without increasing the sensitivity of the ABS to the lapping angle. This is because, after tapered write gap 13 is formed, top layer 25 will be recessed from ABS 11 so that the larger taper angle will not change A1 when ABS line 'aa' is moved.

FIG. 3 shows a 3D view of the structure after tapered write gap 13 has been formed.

FIG. 4 (cross sectional view) and FIG. 5 (3D view of FIG. 4) show the 2$^{nd}$ embodiment of the invention. It differs from the 1$^{st}$ embodiment in that newly added top layer 45 is not simply an extension of bottom layer 14 with a larger taper angle. Instead, layer 45 does not need to be tapered (although using a tapered shape here would still be within the scope of the invention) In FIGS. 4 and 5 we show element 45 as having a rectangular cross-section (our preferred shape) but as long as there is a net increase in the A2/A1 ratio, the objects of the invention will have been met. In general, element 45 will be wider than the top of write gap 13 enabling the achievement of a larger A2/A1.

Process-wise the main departure from the first embodiment is that the second trench, also aligned with the first trench and also formed in the second insulation layer, extends outwards from the mouth of the first trench (typically up to about 0.2 to 0.5 microns in each direction) and has straight, as opposed to sloping, sides. As for the first embodiment, the second trench is then just filled with the same material as before, thereby completing formation of element 14 as illustrated in FIG. 8.

The 3$^{rd}$ embodiment takes a different approach from the previous two embodiments. Instead of changing the A2/A1 ratio, a non-uniform write gap is formed. This is illustrated FIG. 6 which shows that extra non-magnetic layer 63 has been inserted between write pole 14 and trailing shield 12. Thus, the write gap is narrower at the ABS and wider away from it. This reduces flux leakage from the main pole to the write shield. Consequently, for a given A2/A1, this larger separation of the main pole from the trailing shield results in more flux being
delivered at the ABS, while the field gradient is unchanged since the write gap at the ABS is unchanged.

The starting point for forming a write pole built according to the teachings of the third embodiment is similar to the point where, in the first two embodiments, layer 14 has been angle-lapped to provide a suitably tilted surface for layer 13. After deposition of non-magnetic layer 13, as seen in FIG. 9, the non-uniform write gap can be formed by depositing 2$^{nd}$ write gap layer 93 which is then patterned so that it terminates at a distance (typically between about 0.05 and 0.2 microns from the ABS. The process ends with the deposition and patterning of layer 12 to form the trailing shield, as shown in FIG. 11.

What is claimed is:

1. A perpendicular magnetic write pole for magnetic recording, having an air bearing surface (ABS), comprising:
   a first magnetic layer, having a first upper surface and a first planar edge that is normal to said first upper surface and functions as the ABS;
   on said first magnetic layer, there is formed a second magnetic layer having a second upper surface and a second lower surface that is coplanar with and contiguous with said first upper surface to form a continuous structure thereat;
   a beveled planar edge extending downward at an angle between about 10 and 45 degrees to the horizontal, said beveled planar edge originating at said second upper surface, passing through said second layer and intersecting said ABS;
   a write gap in the form of a non-magnetic layer formed on said second upper surface and extending continuously down said beveled planar edge and having a third planar edge that is symmetrically located on and is coplanar with said ABS;
   said first and third planar edges having, in combination, the shape of a trapezoid, having a first maximum width, whose non-parallel sides converge, at a first taper angle, down to a lower surface of said first magnetic layer; and
   wherein a cross-section of said second layer in a plane parallel to and recessed from a plane of said ABS at a position where said beveled planar edge originates has a second maximum width that exceeds said first maximum width by at least 20% of said first maximum width and has the shape of a rectangle;
   whereby additional flux is directed to the ABS without the need to increase said first taper angle.

2. The perpendicular magnetic write pole described in claim 1 wherein said first magnetic layer has a thickness in the range of from 0.2 to 0.4 microns.

3. The perpendicular magnetic write pole described in claim 1 wherein said second magnetic layer has a thickness in the range of from 0.05 to 0.2 microns.

4. The perpendicular magnetic write pole described in claim 1 wherein said non-magnetic layer has a thickness of up to 0.1 microns.

5. The perpendicular magnetic write pole described in claim 1 wherein said non-magnetic layer is selected from the group consisting of $Al_2O_3$, $SiO_2$, and all non-magnetic metals.

* * * * *